(12) United States Patent
Reed (10) Patent No.: US 8,284,620 B2
(45) Date of Patent: *Oct. 9, 2012

(54) MEMORY CONTROLLER-ADAPTIVE 1T/2T TIMING CONTROL

(75) Inventor: David G. Reed, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 533 days.

This patent is subject to a terminal disclaimer.

(21) Appl. No.: 12/502,628

(22) Filed: Jul. 14, 2009

(65) Prior Publication Data

US 2009/0276597 A1  Nov. 5, 2009

Related U.S. Application Data

(63) Continuation of application No. 10/987,022, filed on Nov. 11, 2004, now Pat. No. 7,571,296.

(51) Int. Cl.
G11C 7/00 (2006.01)

(52) U.S. Cl. .................... 365/191; 365/193; 365/230.03; 365/233.1

(58) Field of Classification Search .................. 365/191, 365/193, 230.03, 233.1; 711/167, 105, 158, 711/170

See application file for complete search history.

(56) References Cited

U.S. PATENT DOCUMENTS

| | | | |
|---|---|---|---|
| 5,109,490 A | 4/1992 | Arimilli et al. | |
| 5,301,278 A | 4/1994 | Bowater et al. | |
| 5,504,877 A | 4/1996 | Dornier | |
| 5,870,571 A | 2/1999 | Duburcq et al. | |
| 5,953,215 A | 9/1999 | Karabatsos | |
| 6,038,680 A | 3/2000 | Olarig | |
| 6,097,662 A | 8/2000 | Itou | |
| 6,173,344 B1 | 1/2001 | Mohammed et al. | |
| 6,434,654 B1 | 8/2002 | Story et al. | |
| 6,438,062 B1 | 8/2002 | Curtis et al. | |
| 6,446,158 B1 | 9/2002 | Karabatsos | |
| 6,526,473 B1 | 2/2003 | Kim | |
| 6,715,013 B1 | 3/2004 | Touchet | |
| 7,017,068 B2 | 3/2006 | McBride et al. | |
| 7,042,775 B2 * | 5/2006 | Sawhney | 365/191 |
| 7,219,194 B2 * | 5/2007 | Savell et al. | 711/118 |
| 7,571,296 B2 * | 8/2009 | Reed | 711/167 |
| 7,599,239 B2 * | 10/2009 | Woo et al. | 365/226 |
| 2002/0038404 A1 | 3/2002 | Ryan | |

OTHER PUBLICATIONS

Wikipedia [1]. SIMM. Version as of Nov. 17, 2003. Accessed Jan. 7, 2007. http://en.wikipedia.org/wiki/SIMM.

(Continued)

Primary Examiner — David Lam
(74) Attorney, Agent, or Firm — Kilpatrick Townsend & Stockton LLP (57) ABSTRACT

Circuits, methods, and apparatus that adaptively control 1T and 2T timing for a memory controller interface. An embodiment of the present invention provides a first memory interface as well as an additional memory interface, each having a number of address and control lines. The address and control lines of the redundant memory interface may be individually enabled and disabled. If a line in the additional interface is enabled, it and its corresponding line in the first interface drive a reduced load and may operate at the higher 1T data rate. If a line in the additional interface is disabled, then its corresponding line in the first interface drives a higher load and may operate at the slower 2T data rate. In either case, the operating speed of the interface may also be considered in determining whether each line operates with 1T or 2T timing.

20 Claims, 7 Drawing Sheets

OTHER PUBLICATIONS

Wikipedia [2]. BIOS. Version as of Nov. 10, 2003. Accessed Jan. 7, 2007. http://en.wikipedia.org/wiki/BIOS.

Wikipedia. BIOS. 2003, http://en.wikipedia.org/wiki/BIOS, 2 pages.
Wikipedia. SIMM. 2003, http://en.wikipedia.org/wiki/SIMM, 1 page.

* cited by examiner

| PIN 710 | A-1 ENABLED -AND- 720 | | A-1 DISABLED -AND- 730 | |
| --- | --- | --- | --- | --- |
| | ≤ 200MHZ | > 200MHZ | ≤ 100MHZ | > 100MHZ |
| A1[14:2] | 1T  (722) | 2T  (724) | N/A  (732) | N/A |
| A1[1:0] | 1T | 2T | N/A | N/A |
| RAS 1 | 1T | 2T | N/A | N/A |
| CAS 1 | 1T | 2T | N/A | N/A |
| WE 1 | 1T | 2T | N/A | N/A |
| CE 1 | 1T | 2T | N/A | N/A |
| A2[14:2] | 1T | 2T | 1T | 2T |
| A2[1:0] | 1T | 2T | 1T  (734) | 2T  (736) |
| RAS 2 | 1T | 2T | 1T | 2T |
| CAS 2 | 1T | 2T | 1T | 2T |
| WE 2 | 1T | 2T | 1T | 2T  (738) |
| CE 2 | 1T | 2T | 1T | 2T |
| CS[3:2] | N/A | N/A | N/A | N/A |
| CS[1:0] | N/A | N/A | N/A | N/A |

FIG. 7

MEMORY CONTROLLER-ADAPTIVE 1T/2T TIMING CONTROL

CROSS REFERENCES TO RELATED APPLICATIONS

The present application claims priority to and is a continuation application of U.S. application Ser. No. 10/987,022, entitled "MEMORY CONTROLLER-ADAPTIVE 1T/2T TIMING CONTROL" filed Nov. 11, 2004, the entire contents of which are herein incorporated by reference for all purposes.

BACKGROUND

The present invention relates generally to increasing data rates for data interfaces, and more specifically to adaptive 1 T/2T timing for memory controller interfaces.

Data rates in computer systems have been increasing at a dramatic rate for some years now. In particular, processor speeds have faithfully followed or exceed Moore's Law. But memory interface speeds have not kept track with this pace, and are quickly becoming a bottleneck in computer systems.

One reason that memory interface data rates have not increased at such a rate is that memory interface signals must drive large off-chip capacitive loads including several integrated circuits, whereas processors only drive signals on chip. Typically, a memory interface output cell drives a printed circuit board trace, one or more sockets, and one or more memory devices, such as dual-in-line memories (DIMMs). To make matters worse, each of these DIMMs typically include several individual dynamic random-access memories (DRAMs) devices.

This structure forms a distributed capacitance having a number of unmatched terminations. When an output circuit that is part of a memory interface drives this load, the resulting signal is corrupted by ringing, reflections, slowed edge rates, and other degradations.

This reduction in signal integrity is particularly disruptive at higher data rates. At slower data rates, these signals have more time following a transition for reflections and ringing to dissipate and settle. Accordingly, a methodology has been developed wherein the signals of a memory interface may be slowed.

This modification is referred to as 1T/2T timing. Simply stated, 1T timing is used when memory interface signals can be switched at their highest data speed without losing data caused by loss of signal integrity. 2T timing is used when data transferred at this rate could be lost due to this loss of signal integrity. A system BIOS (Basic Input Output System) often includes a setting that determines whether a memory interface uses 1T or 2T timing.

Since the data rate for 1T timing is twice that of 2T, it is desirable to operate at 1T timing as much as possible. Accordingly, what is needed are circuits, methods, and apparatus that enable a memory interface to adaptively operate at 1T timing instead of 2T timing when possible.

SUMMARY

Accordingly, embodiments of the present invention provide circuits, methods, and apparatus that adaptively control 1T and 2T timing for a memory controller interface. An embodiment of the present invention provides a first memory interface as well as an additional or redundant memory interface, each having a number of address and control lines. The address and control lines of the redundant memory interface may be individually enabled and disabled. If a line in the additional interface is enabled, then it and its corresponding line in the first interface each drive a reduced capacitive load and may operate at the higher 1T data rate. If a line in the additional interface is disabled, then its corresponding line in the first interface likely drives a higher load and may operate at the slower 2T data rate.

In either case, the operating speed of the interface may also be considered. If the operating speed is slow enough, 1T timing may be used even if line loading is high, whereas at high rates, 2T timing may need to be used even if the line in the additional interface is enabled. Various embodiments of the present invention may incorporate one or more of these and the other features described herein.

An exemplary embodiment of the present invention provides an integrated circuit. This integrated circuit includes a memory controller interface. The memory controller interface includes a first plurality of address lines coupled to a first memory, a first plurality of control lines coupled to the first memory, a second plurality of address lines coupled to a second memory, and a second plurality of control lines coupled to the second memory, wherein at least one of the first plurality of control lines is also coupled to the second memory.

Another exemplary embodiment of the present invention provides a method of determining 1T or 2T timing for a memory interface signal that is provided by a memory interface. This method includes determining a number of memory circuits to be driven by the interface signal and determining a frequency of operation of the memory interface. If the number of memory circuits is at or below a first number and the frequency of operation of the memory interface is less than a first frequency, then 1T timing is used for the memory interface signal. If the number of memory circuits is above the first number and the frequency of operation is less than a second frequency, then 1T timing is used for the memory interface signal. Otherwise, 2T timing is used for the memory interface signal.

A further exemplary embodiment of the present invention provides an integrated circuit. This integrated circuit includes a first memory interface comprising a first plurality of address lines and a first plurality of control lines, a second memory interface comprising a second plurality of address lines and a second plurality of control lines, and a control circuit configured to individually disable each of the first plurality of address lines and the first plurality of control lines, and further configured to store a number of memory devices to be driven by each of the first plurality of address lines and each of the first plurality of control lines.

A better understanding of the nature and advantages of the present invention may be gained with reference to the following detailed description and the accompanying drawings.

DESCRIPTION OF EXEMPLARY EMBODIMENTS

Figure 1:
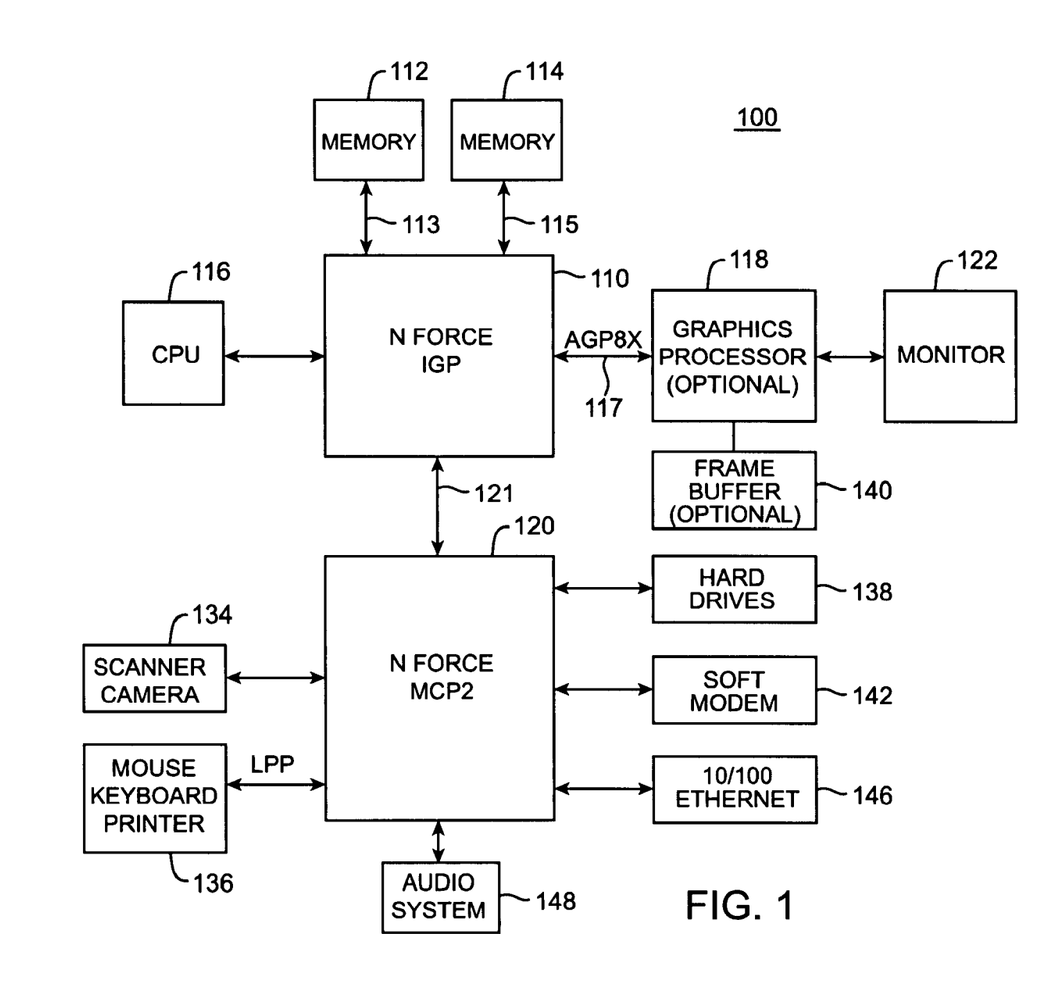
FIG. 1 is a block diagram of an improved computer system 100 that benefits by the incorporation of embodiments of the present invention.

FIG. 1 is a block diagram of an improved computer system 100 that benefits by the incorporation of embodiments of the present invention. The improved computer system 100 includes an NVIDIA nForce™2 integrated graphics processor (IGP) 110, an nForce2 media communications processor (MCP2) 120, memory 112 and 114, CPU 116, optional graphics processor 118 and frame buffer 140, monitor 122, scanner or camera 134, mouse, keyboard, and printer 136, hard drives 138, soft modem 142, Ethernet network or LAN 146, and audio system 148.

This revolutionary system architecture has been designed around a distributed processing platform, which frees up the CPU to perform tasks best suited to it. Specifically, the nForce2 IGP 110 includes a graphics processing unit (GPU) (not shown) which is able to perform graphics computations previously left to the CPU 116. Alternately, the nForce2 IGP 110 may interface to an optional GPU 118 which performs these computations. Also, nForce2 MCP2 120 includes an audio processing unit (APU), which is capable of performing many of the audio computations previously done by the CPU 116. In this way, the CPU is free to perform its tasks more efficiently. Also, by incorporating a suite of networking and communications technologies such as USB and Ethernet, the nForce2 MCP2 120 is able to perform much of the communication tasks that were previously the responsibility of the CPU 116.

In this architecture, the nForce2 IGP 110 communicates with memories 112 and 114 over buses 113 and 115. The nForce2 IGP 110 also interfaces to an optional graphics processor 118 over an advanced AGP bus 117. In various computer systems, optional processor 118 may be removed, and the monitor 122 may be driven by the nForce2 IGP 110 directly. In other systems, there may be more than one monitor 122, some or all of which are coupled to optional graphics processor 118 or the nForce2 IGP 110 directly. The nForce2 IGP 110 communicates with the nForce2 MCP2 120 over a HyperTransport™ link 121. The optional graphics processor 118 may also interface with external memory, which is not shown in this example.

The nForce2 MCP2 120 contains controllers for Ethernet connections 146 and a soft modem 142. The nForce2 MCP 120 also includes interfaces for a mouse, keyboard, and printer 136, and USB ports for cameras and scanners 134 and hard drives 138.

This arrangement allows the CPU 116, the nForce2 TGP 110, and the nForce2 MCP2 120, to perform processing independently, concurrently, and in a parallel fashion.

Embodiments of the present invention may be used to increase the data rate at various interfaces in the system of FIG. 1, as well as similar or other electronic and computer systems. For example, embodiments of the present invention may be used to improve data rates at the interface between the graphics processor 118 and frame buffer or graphics memory 140, if those circuits are included, or between a graphics processor included in the nForce2 IGP 110 and memories 112 and 114.

Figure 2:
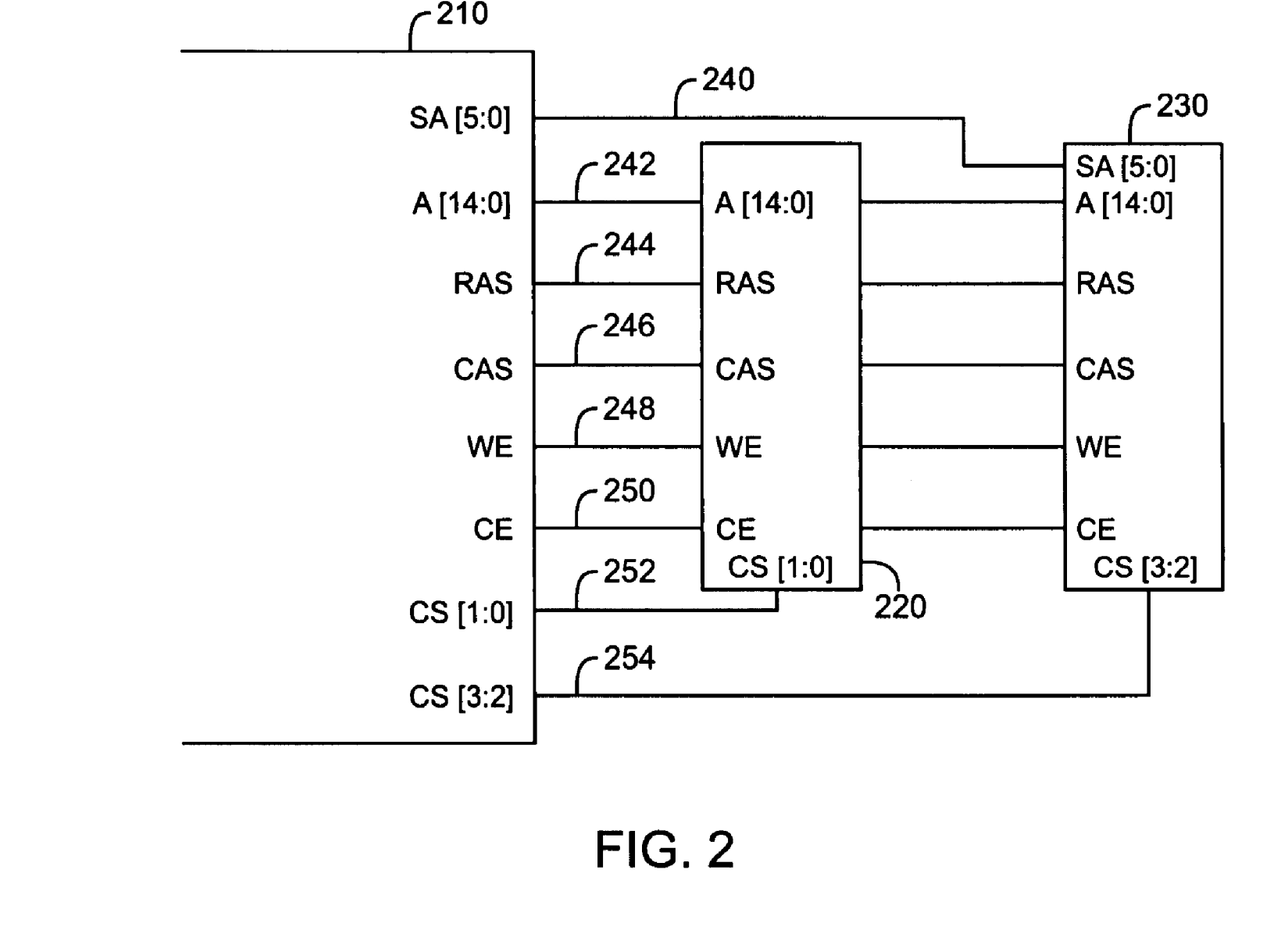
FIG. 2 is a block diagram of a memory interface that may be improved by incorporation of embodiments of the present invention.

FIG. 2 is a block diagram of a memory interface that may be improved by incorporation of embodiments of the present invention. This block diagram includes an integrated circuit 210 and two memory circuits 220 and 230. In this specific embodiment, two memory circuits 220 and 230 are shown, while in other embodiments of the present invention, other numbers of memory circuits may be included. For example, three or four or memory circuits may be included. This figure, as with the other included figures, is shown for illustrative purposes only, and does not limit the possible embodiments of the present invention or the claims.

The integrated circuit 210 may be a graphics processor, such as the graphics processor 118 in FIG. 1, a graphics processor included in the nForce2 IGP 110 also in FIG. 1, or other graphics processor. This integrated circuit includes a memory interface having drivers for a number of address and control lines. The memory circuits 220 and 230 may be DIMMs formed of multiple DRAMs, or other memory circuits.

In this embodiment, address lines A[14:6] on lines 242 and control signals such as row address select RAS on line 244, column address select CAS on line 246, write enable WE on line 248 and chip enable CE on line 250, are shared between the memory circuits 220 and 230. Other signal lines such as the chip select signals CS on lines 252 and 254, and address lines SA[5:0] and A[5:0] on lines 240 and 242, are individualized to the particular memory circuits.

Each of the memory circuits 220 and 230 are typically made up of a number of integrated circuits placed together on a printed circuit board substrate. Typically, this printed circuit board substrate is inserted as a daughterboard onto a computer system or graphics card motherboard. Accordingly, each of the pins of the memory interface of the integrated circuit 210 drives a large number of capacitive loads distributed along a number of wire segments. Because of this, a problem arises as the memory interface in the integrated circuit 210 drives signals to the memory circuits 220 and 230 at a high switching frequency.

Specifically, the signal edge rates are slowed, reflections are caused by mismatched terminations, and ringing and cross coupling occur. These limit the speed at which the pins of a memory interface in the integrated circuit 210 can drive the memory circuits 220 and 230. For simplicity, data pins are not shown as part of the memory interface of the integrated circuit 210, and the integrated circuits in the other figures, since they typically drive fewer loads and therefore do not experience these same problems.

Again, a methodology has been devised for memory interfaces where address and control pins operate at a reduced rate when the frequency of operation at their memory interface is fast enough such that signal integrity is compromised. This is commonly referred to as 1T/2T timing. Specifically, pins that can operate at full speed are switched using 1T timing, while pins that need more time for ringing and reflections to settle are switched using 2T timing.

Figure 3:
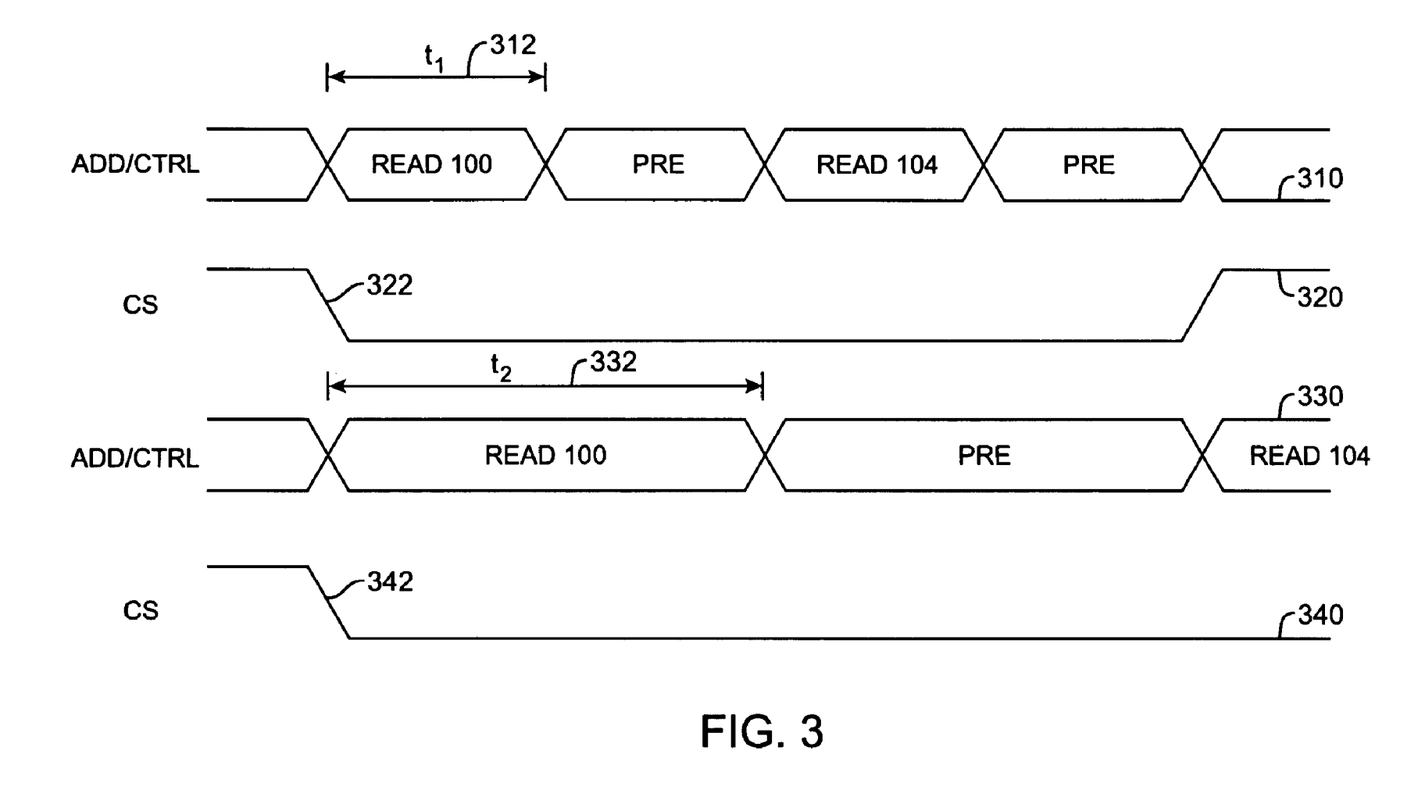
FIG. 3 is a timing diagram illustrating 1T and 2T timing for a memory interface.

FIG. 3 is a timing diagram illustrating 1T and 2T timing for a memory interface. In this figure, the address and control lines 310 are driven at a data rate corresponding to $T_1$ 312, which is 1T timing. The address and control lines 330 on the other hand, are switched every time period $T_2$ 332, which corresponds to 2T timing.

As can be seen, it is desirable to operate memory interface pins at 1T timing to improve data rates. Again, this may not be possible in all cases because of the degradation of signal integrity caused by reflections and ringing due to the capacitive loading of the memory circuits 220 and 230. Typically, if the frequency of operation is above a threshold frequency, 2T timing is utilized, otherwise 1T timing is employed.

One technique that improves the interface shown in FIG. 2 is to include a separate interface for each of the memory circuits 220 and 230. An example of a memory interface that may selectively operate in this way may be found in copending U.S. application Ser. No. 10/706,056, filed Nov. 12, 2003, titled Memory Address and Datapath Multiplexing, by Malachowsky et al., which is incorporated by reference.

Figure 4:
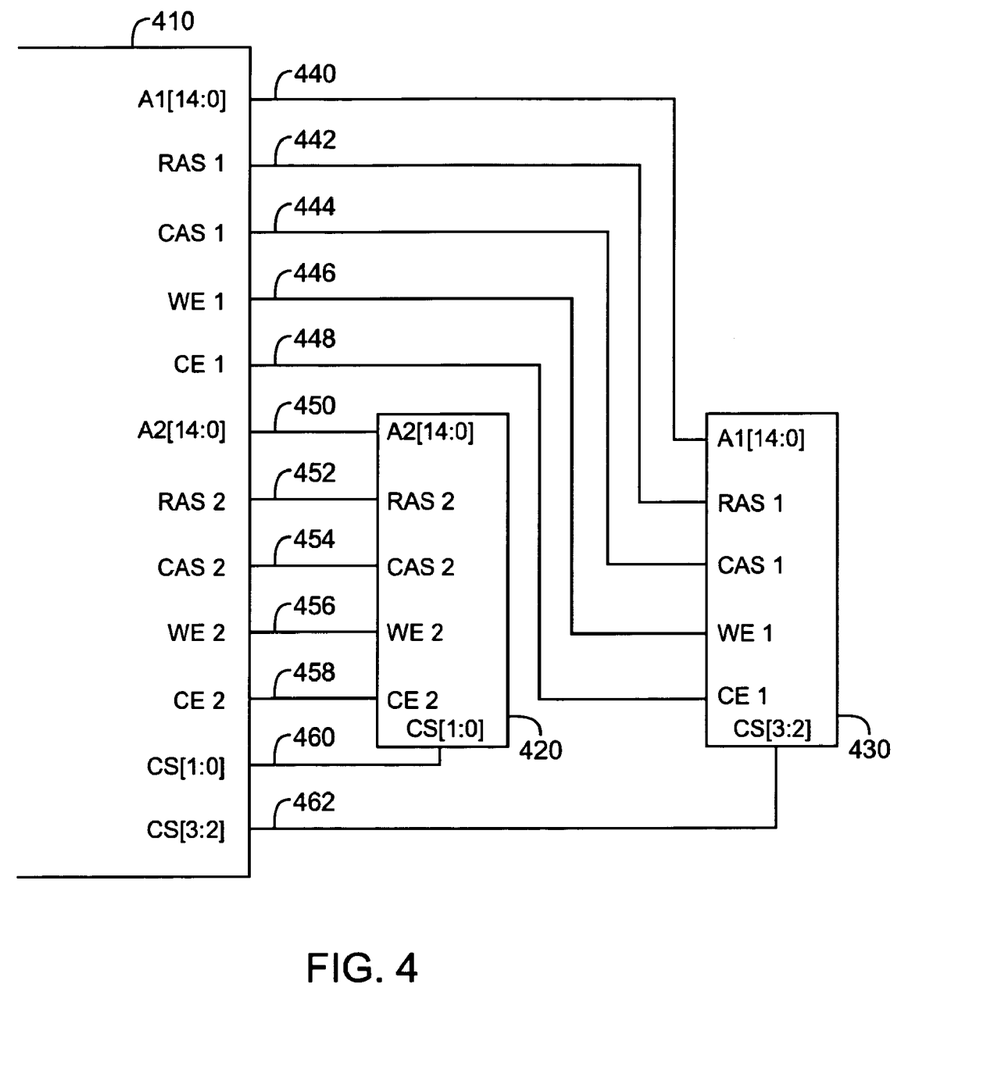
FIG. 4 is a block diagram of a memory interface that may be improved by incorporation of embodiments of the present invention.

FIG. 4 is a block diagram of a memory interface that may be improved by incorporation of embodiments of the present invention. This block diagram includes an integrated circuit 410, and memory circuits 420 and 430. Again, the integrated circuit 420 may be the graphics processor 118 in FIG. 1, or a graphics processor included in the nForce2 IGP 110 also in FIG. 1, or other graphics processor. The memory circuits 420 and 430 again are typically DIMMs.

In this specific example, each of the address and control lines are duplicated for the memory circuit 420. This reduces the capacitive loading on each interface circuit by a factor of approximately two, although trace capacitances of the lines connecting the integrated circuit 420 and each of the memory circuits 420 and 430 are typically not reduced by factor of two.

One difficulty that arises in using this technique is that the memory interface in the integrated circuit 420 includes a tremendous number of pins. For example, in a specific embodiment, there are 580 memory interface signal pins. This becomes a logistic nightmare when trying to place and route these lines on a printed circuit board.

Printed circuit boards typically have many layers, for example four, six, or more layers. The cost of these boards increases as the number of the layers increases. For example, a four layer board may cost 8 dollars, while a six layer board may cost $12. Therefore, it is highly desirable to limit the number of layers on a printed circuit.

But limiting the number of layers exacerbates the routing difficulties caused by the large number of lines for the memory interface in integrated circuit 410. Accordingly, embodiments of the present invention allow a user to separately route address and control lines to different memory circuits while sharing other address and control lines between both of the memory circuits 420 and 430—and other memory circuits if other memory circuits are included.

Figure 5:
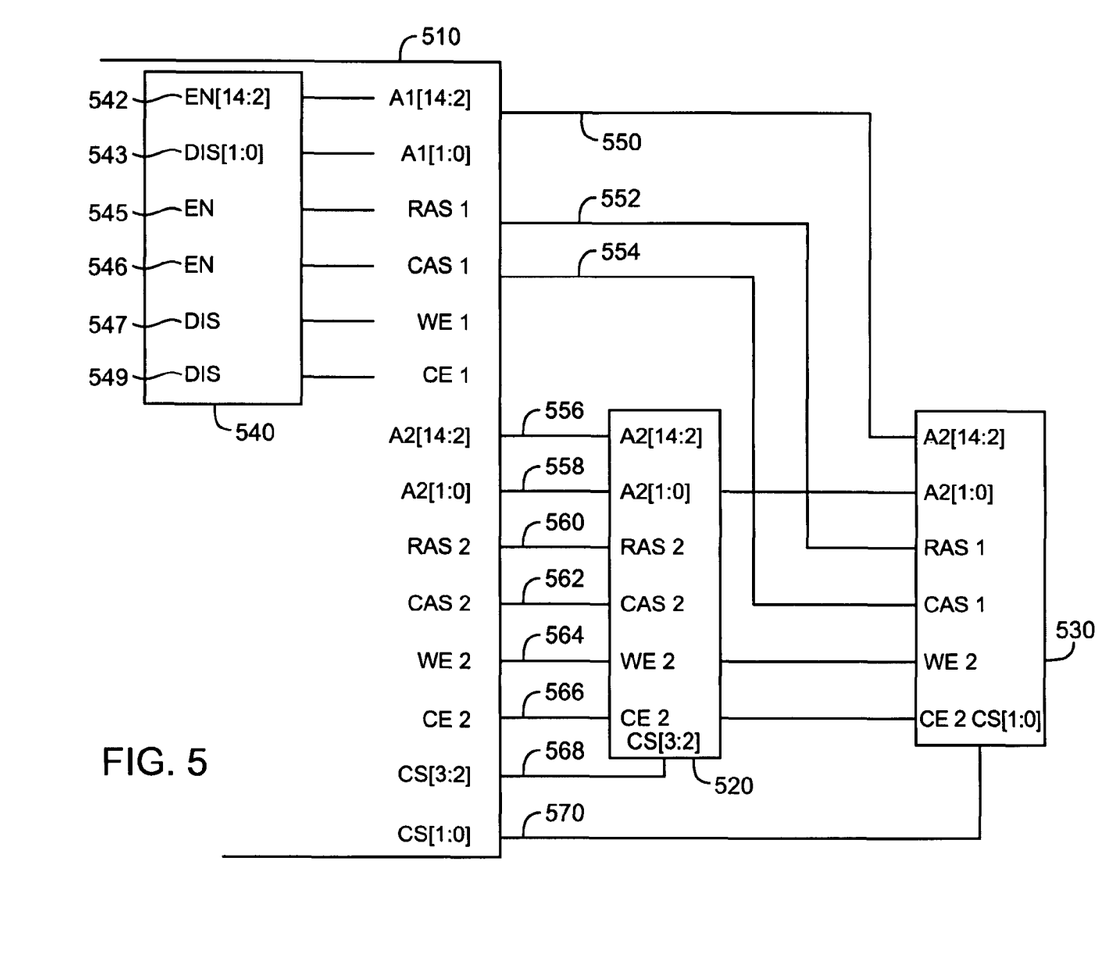
FIG. 5 is a block diagram of a memory interface in accordance with an embodiment of the present invention.

FIG. 5 is a block diagram of a memory interface in accordance with an embodiment of the present invention. This block diagram includes an integrated circuit 510 and memory circuits 520 and 530. The integrated circuit further includes a table or plurality of memory or storage locations 540, and associated circuitry that selectively enable, disable, and control of the timing of the pins of the memory interface.

In this specific example, some address and control lines are routed individually to each of the memory devices 520 and 530. Specifically, address A1[14:2] on lines 550, and the RAS1 signal on line 552 and CAS1 signal on line 554 are routed individually to the memory circuit 530, while address A2[14:2] on lines 556, and the RAS2 signal on line 560 and CAS2 signals on line 562 are routed individually to the memory circuit 520. Other address and control lines are routed to both of the memory circuits 520 and 530. Specifically, address A2[1:0] on line 556 and control lines WE2 on line 564 and CE2 on line 566 are routed to both memory devices 520 and 530.

The decision making process for determining which control signal lines should be individually routed and which should be separately routed is typically made on a case-by-case basis. Factors in this decision making process include common operations for the system and available printed circuit board space for the interface wires. For example, if certain memory locations are often addressed in sequence, some particular address lines may be routed individually while some may be routed to both memory circuits 520 and 530.

The table 540 and associated circuitry control which of the output pins of the interface of the integrated circuit 510 are enabled and the frequency at which they operate. For example, in this particular case, some of the address lines, as well as the write enable WE1 and chip enable CE1 lines are not routed, therefore these pins are disabled. Further, some pins such as RAS1 on line 552 and CAS1 on line 554 drive only one memory circuit, while other pins, such as chip enable CE2 on line 566 drive both of the memory circuits 520 and 530.

Accordingly, table 540 considers whether an individual pin is enabled or disabled, how many memory circuits it is driving, and the frequency of operation for the memory interface, and then determines whether the output driver should operate at 1T or 2T timing.

Typically, if a pin is not used, it is disabled. If a pin is used and drives both memory circuits at a lower rate, for example below 100 MHz, 1T timing may be used, however, if the pin is used and drives both memory circuits at a higher rates, for example above 100 MHz, 2T timing is used. Similarly, if a pin is used and drives only one memory circuit below a second rate, for example below 200 MHz, 1T timing may be used, though if the frequency of operation is higher than this second threshold, 2T timing is used.

The table 540 may be generated during power up using information provided by the system BIOS. For example, the BIOS may determine the number of memory circuits included and the frequency of operation of the memory interface. These parameters may be passed to circuitry associated with the table 540 and used in determining 1T/2T timing for each of the pins.

Figure 6:
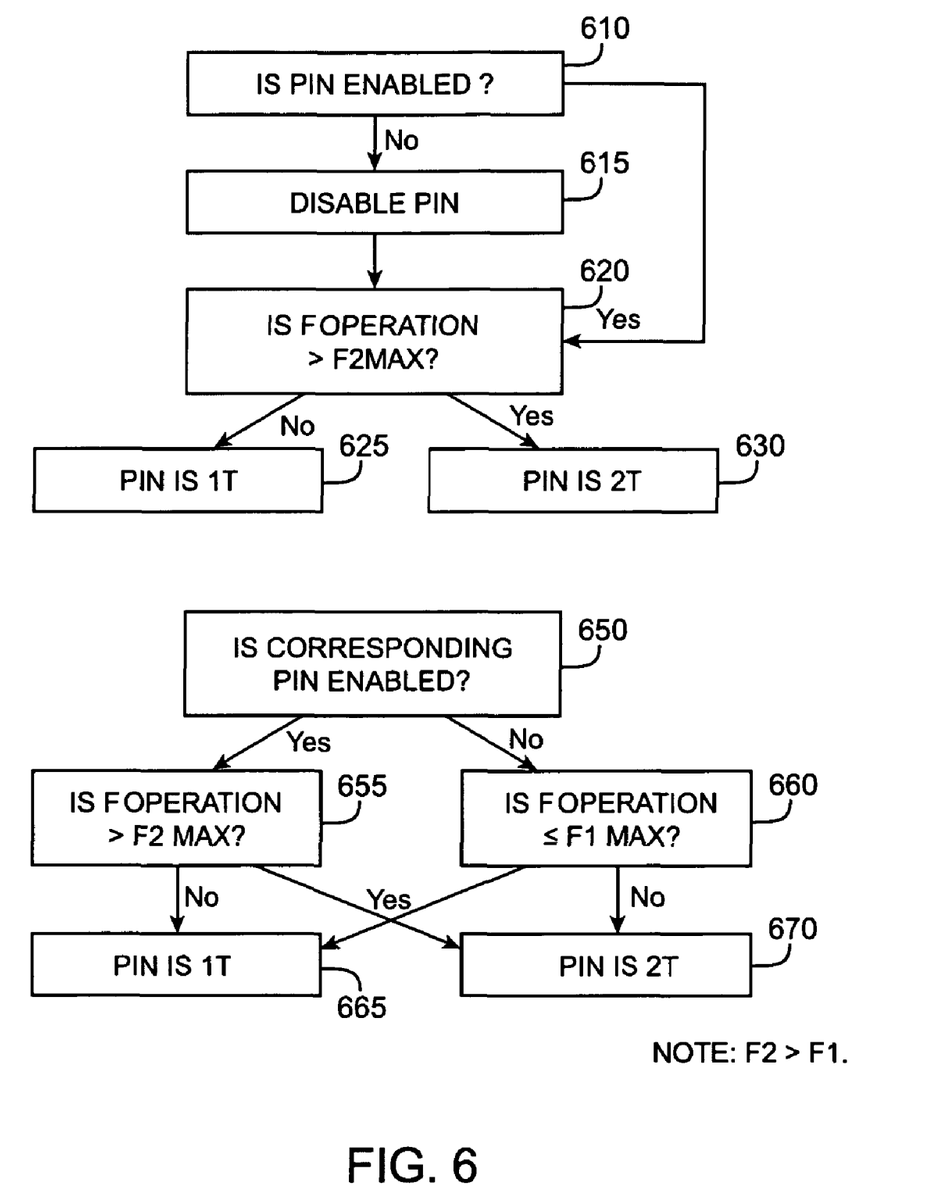
FIG. 6 is a flow chart of a method of determining timing for signals at a memory interface according to an embodiment of the present invention.

FIG. 6 is a flow chart of a method of determining timing for signals at a memory interface according to an embodiment of the present invention. Pins that have been included as part of a redundant memory interface begin at act 610. In act 610, it is determined whether the pin is enabled, that is, whether this pin has been routed. This is typically provided at start up of the device and stored in table 540. If this pin has not been enabled, the pin is disabled. If the pin has been enabled, if it is determined in act 620 whether the frequency of operation is above a first threshold, F2MAX. If the frequency of operation is above this first threshold frequency, again for example 200 MHz, the pin should operate at 2T timing, as shown in act 630. However, if the frequency of operation is below this threshold, the pin may operate at 1T timing, act 625.

The non-redundant pins begin at act 650. In act 650, it is determined whether the corresponding pin in the redundant or additional memory interface is enabled. (Alternately, the number of memory devices to be driven by the pin may be known or determine directly.) If the corresponding pin has been enabled, it is determined in act 655 whether the frequency of operation is above a first threshold, F2MAX. If it is, 2T timing is used, as shown in act 670, if not, 1T timing is used, act 665. This threshold may be the same threshold as was used in act 620, and is labeled as such, though it may be a different threshold.

If the corresponding pin has not been enabled, it is known that this pin is driving all the included memory circuits. Alternately, the number of memory circuits driven by this pin may be known directly, for example it may be stored in the table 540. In this case, it is determined whether the frequency of operation is below a second threshold, which is typically less than the first threshold, in act 660. If it is, 1T timing may be used, as shown in act 665, if not, 2T timing is used, act 670.

Figure 7:
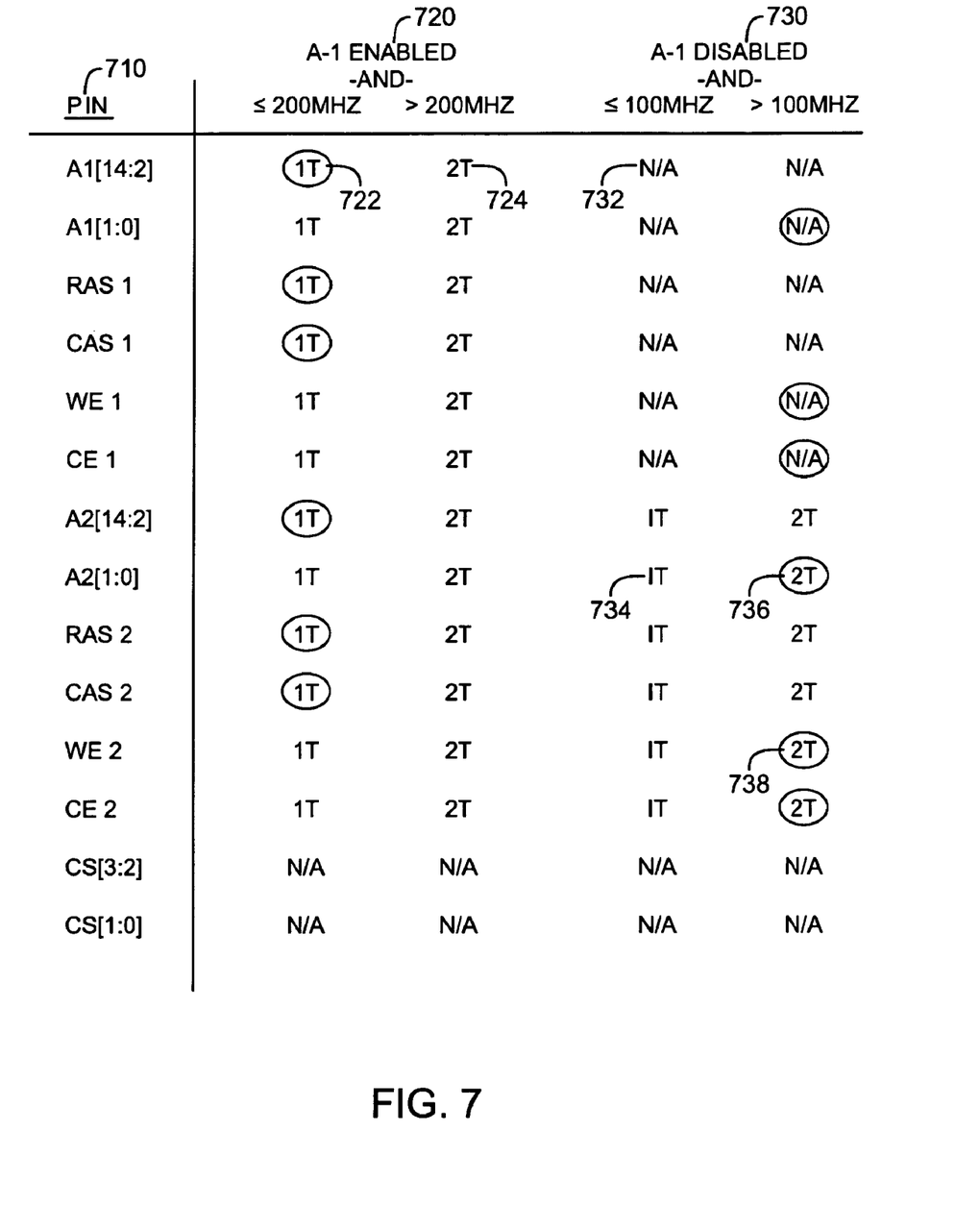
FIG. 7 is a table showing timing options for signals at a memory interface according to an embodiment of the present invention.

FIG. 7 is a table showing timing options for signals at a memory interface according to an embodiment of the present invention. This table includes a column 710 showing the pins of the memory interface, columns 720 showing the 1T/2T decision if the corresponding pin in redundant interface is enabled, and columns 730 illustrating the 1T/2T decision if the corresponding pin in the redundant interface is disabled.

Again, in this specific example, the frequency thresholds are 100 MHz and 200 MHz for simplicity. Also for simplicity, the table entries corresponding to the interface of FIG. 5 when its is operating at 150 MHz have been circled. For example, the address lines A1[14:2] have their corresponding pins enabled, and since the frequency of operations is below 200 MHz, these pins may operate at 1T as shown by entry 722. If the frequency of operation increases above 200 MHz, 2T timing would be used, as shown by entry 724. If these pins are disabled, 1T/2T timing would be inapplicable, as shown by entries 732. Similarly, the write enable line WE2 has its corresponding pin, WE1, disabled, and since its frequency of operation as above 100 MHz, 2T timing is used, as is shown by entry 738.

In this way, users may route signal lines in such a way as to optimize 1T timing while reducing board layout time, or while simply making it possible to route all the memory interface lines. Further, each connected signal line can operate at 2T or 1T timing, as is appropriate for the frequency of its operation given its loading.

Again, in each of the examples shown above, two memory circuits were included. In other embodiment of the present invention, other numbers of memory circuits may be included. Also in the specific embodiments, one additional, or redundant, set of memory interface lines was included. In other embodiments of the present invention, two or more redundant sets or partial sets of lines may be included.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An integrated circuit comprising a memory controller interface comprising:
   a first plurality of address lines coupled to a first memory circuit;
   a first plurality of control lines coupled to the first memory circuit;
   a second plurality of address lines coupled to a second memory circuit; and
   a second plurality of control lines coupled to the second memory circuit,
   wherein when a first control line in the first plurality of control lines is also coupled to the second memory circuit and the memory controller interface operates at an interface frequency below a first frequency, then the first control line operates at a first rate; and
   wherein when the first control line is not also coupled to the second memory and the interface frequency is below a second frequency, the second frequency higher than the first frequency, then the first control line also operates at the first rate,
   otherwise the first control line operates at the second rate, where the first rate is faster than the second rate,
   wherein when the first control line is not also coupled to the second memory and the memory controller interface operates at a frequency above the second frequency, then the first control line operates at the second rate.

2. The integrated circuit of claim 1, wherein when the first control line is also coupled to the second memory circuit and the memory controller interface operates at a frequency above the first frequency, then the first control line also operates at the second rate.

3. A system comprising:
   a first memory circuit;
   a second memory circuit; and
   a memory controller interface comprising:
      a first plurality of address lines coupled to a first memory circuit;
      a first plurality of control lines coupled to the first memory circuit;
      a second plurality of address lines coupled to a second memory circuit; and
      a second plurality of control lines coupled to the second memory circuit,
      wherein when a first control line in the first plurality of control lines is also coupled to the second memory circuit and the memory controller interface operates at an interface frequency below a first frequency, then the first control line operates at a first rate; and
      wherein when the first control line is not also coupled to the second memory and the interface frequency is below a second frequency, the second frequency higher than the first frequency, then the first control line also operates at the first rate,
      otherwise the first control line operates at the second rate, where the first rate is faster than the second rate,
      wherein when the first control line is not also coupled to the second memory and the memory controller interface operates at a frequency above the second frequency, then the first control line operates at the second rate.

4. The system of claim 3, wherein when the first control line is also coupled to the second memory circuit and the memory controller interface operates at a frequency above the first frequency, then the first control line also operates at the second rate.

5. The system of claim 3, further comprising:
   a third memory circuit, wherein the first plurality of address lines and first plurality of control lines are further coupled to the third memory circuit.

6. An integrated circuit comprising a memory controller interface comprising:
   a first plurality of address lines coupled to a first memory circuit;
   a first plurality of control lines coupled to the first memory circuit;
   a second plurality of address lines coupled to a second memory circuit; and
   a second plurality of control lines coupled to the second memory circuit,
   wherein when a first control line in the first plurality of control lines is also coupled to the second memory circuit and the memory controller interface operates at an interface frequency below a first frequency, then the first control line operates at a first rate; and wherein when the first control line is not also coupled to the second memory and the interface frequency is below a second frequency, the second frequency higher than the first frequency, then the first control line also operates at the first rate, otherwise the first control line operates at the second rate, where the first rate is faster than the second rate, wherein a second control line in the first plurality of control lines operates at a different rate than the first control line, and wherein the first and second control lines respectively carry a signal selected from a group consisting of a row address select signal, a column address select signal, a write enable signal, and a chip enable signal.

7. The integrated circuit of claim 6 wherein when the second control line in the first plurality of control lines is also coupled to the second memory circuit and the interface frequency is below the first frequency, then the second control line operates at the first rate; and wherein when the second control line is not also coupled to the second memory and the interface frequency is below the second frequency, then the second control line also operates at the first rate, otherwise the second control line operates at the second rate.

8. The integrated circuit of claim 7 wherein the first control line operates at the first rate and the second control line operates at the second rate.

9. The integrated circuit of claim 6 wherein the second memory circuit is addressed by the second plurality of address lines and at least one of the first plurality of address lines, and wherein the second memory circuit is controlled by the second plurality of control lines and the at least one of the first plurality of control lines.

10. The integrated circuit of claim 6 wherein when the first control line operates at the first rate, the first control line operates with 1T timing, and when the first control line operates at the second rate, the first control line operates with 2T timing, where the first control line operating with 1T timing has a rate that is twice the rate as the first control line operating with 2T timing.

11. The integrated circuit of claim 6 wherein the integrated circuit includes a graphics processor, and wherein the first and second memory circuits are dual-in-line memory modules.

12. An integrated circuit comprising a memory controller interface comprising:
   a first plurality of address lines coupled to a first memory circuit;
   a first plurality of control lines coupled to the first memory circuit;
   a second plurality of address lines coupled to a second memory circuit; and
   a second plurality of control lines coupled to the second memory circuit,
   wherein when a first address line in the first plurality of address lines is also coupled to the second memory circuit and the memory controller interface operates at an interface frequency below a first frequency, then the first address line operates at a first rate; and
   wherein when the first address line is not also coupled to the second memory and the interface frequency is below a second frequency, the second frequency higher than the first frequency, then the first address line also operates at the first rate,
   otherwise the first address line operates at the second rate, where the first rate is faster than the second rate, wherein a second address line in the first plurality of address lines operates at a different rate than the first address line.

13. An integrated circuit comprising:
   a first memory interface comprising a first plurality of address lines and a first plurality of control lines;
   a second memory interface comprising a second plurality of address lines and a second plurality of control lines; and
   a control circuitry configured to:
      identify a number of memory devices to be driven by each of the first plurality of address lines and each of the first plurality of control lines; and
      individually disable each of the first plurality of address lines and the first plurality of control lines that are not used to drive a memory device,
   wherein after an address line or a control line has been disabled, that disabled line is not used by the first memory interface to send a signal to a memory device,
   wherein a result of a control line of the first plurality of control lines being disabled is that a corresponding control line of the second plurality of control lines is enabled, and
   wherein the control circuitry is further configured to store a determination of whether the first memory interface is to operate at a frequency below a first frequency.

14. The integrated circuit of claim 13, wherein the control circuitry is further configured to store the number of memory devices to be driven by each of the first plurality of address lines and each of the first plurality of control lines.

15. An integrated circuit comprising:
   a first memory interface comprising a first plurality of address lines and a first plurality of control lines;
   a second memory interface comprising a second plurality of address lines and a second plurality of control lines; and
   a control circuitry configured to:
      identify a number of memory devices to be driven by each of the first plurality of address lines and each of the first plurality of control lines; and
      individually disable each of the first plurality of address lines and the first plurality of control lines that are not used to drive a memory device,
   wherein after an address line or a control line has been disabled, that disabled line is not used by the first memory interface to send a signal to a memory device,
   wherein a result of a control line of the first plurality of control lines being disabled is that a corresponding control line of the second plurality of control lines is enabled, and
   wherein the control circuitry is further configured to determine whether each of the first plurality of address lines and each of the first plurality of control lines are disabled, operating at 1T timing, or operating at 2T timing, wherein when a line operates at 1T timing it has a rate that is twice the rate as when the line operates at 2T timing.

16. The integrated circuit of claim 15 wherein the control circuitry determines that one of the enabled first plurality of control lines should operate at 1T timing if the number of memory devices to be driven is below a first number and the frequency of operation is below a first frequency or the number of memory devices to be driven is above the first number and the frequency of operation is below a second frequency, wherein the second frequency is lower than the first frequency.

17. The integrated circuit of claim 16 wherein the control circuitry determines that one of the enabled first plurality of control lines should operate at 2T timing if the number of memory devices to be driven is below the first number and the frequency of operation is above the first frequency or the number of memory devices to be driven is above the first number and the frequency of operation is above the second frequency.

18. The integrated circuit of claim 16 wherein the control circuitry is further configured to determine the number of memory devices to be driven by each of the second plurality of address lines and each of the second plurality of control lines and further configured to determine whether the second plurality of address lines and the second plurality of control lines should operate at 1T or 2T timing or disabled,
  wherein the control circuitry determines that one of the enabled second plurality of control lines should operate at 1T timing if the number of memory devices to be driven is below a first number and the frequency of operation is below a first frequency or the number of memory devices to be driven is above the first number and the frequency of operation is below a second frequency.

19. The integrated circuit of claim 18 wherein the control circuitry determines that one of the enabled second plurality of control lines should operate at 2T timing if the number of memory devices to be driven is below the first number and the frequency of operation is above the first frequency or the number of memory devices to be driven is above the first number and the frequency of operation is above the second frequency.

20. The integrated circuit of claim 15, wherein the control circuitry is further configured to store the number of memory devices to be driven by each of the first plurality of address lines and each of the first plurality of control lines.

* * * * *